United States Patent [19]

Boutillier

[11] 3,764,642

[45] Oct. 9, 1973

[54] METHOD FOR EXTRUDING PROFILED SECTIONS OF EXPANDED THERMO PLASTIC MATERIAL HAVING AN INTEGRAL SKIN

[75] Inventor: Pierre Emile Boutillier, Colombes, France

[73] Assignee: Societe Anonyme Ugine Kuhlmann, Paris, France

[22] Filed: Mar. 20, 1969

[21] Appl. No.: 808,760

Related U.S. Application Data

[63] Continuation-in-part of Ser. No. 664,738, Aug. 31, 1967, abandoned.

[30] Foreign Application Priority Data

Mar. 25, 1968 France .......................... 68145290

[52] U.S. Cl. .................. 264/47, 161/161, 161/165, 264/48, 264/54, 264/237, 264/DIG. 5, 264/DIG. 14, 425/4 C
[51] Int. Cl. ..................... B29d 7/02, B29d 27/00
[58] Field of Search ................. 264/47, 46, 48, 237

[56] References Cited
UNITED STATES PATENTS

| 3,300,554 | 1/1967 | Bachus ............................. 264/47 |
| 3,413,388 | 11/1968 | Lux et al. ........................ 264/46 |
| 3,431,164 | 3/1969 | Gilbert ........................... 264/48 X |
| 3,363,034 | 1/1968 | Noland et al. .................... 264/48 |
| 3,413,387 | 11/1968 | Ohsol .............................. 264/46 |
| 3,431,163 | 3/1969 | Gilbert ........................... 161/161 |
| 3,387,067 | 6/1968 | McCurdy ......................... 264/53 |

Primary Examiner—Philip E. Anderson
Attorney—Brumbaugh, Graves, Donohue & Raymond

[57] ABSTRACT

This invention relates to the manufacture by extrusion profiled products of expanded plastic material. An expansible plastic composition is extruded through an annular die opening into a cooled shaper having the same cross-section as the desired product, in such a manner that a high-density, rigid skin is formed on the extrudate and the composition expands inwardly within the shaper.

15 Claims, 16 Drawing Figures

PATENTED OCT 9 1973 3,764,642

PIERRE EMILE BOUTILLIER

PIERRE EMILE BOUTILLIER

METHOD FOR EXTRUDING PROFILED SECTIONS OF EXPANDED THERMO PLASTIC MATERIAL HAVING AN INTEGRAL SKIN

This is a continuation-in-part of my prior application Ser. No 664,738 filed Aug. 31, 1967, now abandoned.

The extrusion of expansible plastic materials through a die gives arise to difficulties because the expansible material, which contains an expanding agent capable of forming a very large number of small cavities inside the mass, to give an end product in the form of a rigid, semi-rigid, or flexible foam, must be only slightly expanded, if at all, when it is forced through the die, if a regular flow is to be obtained. Moreover, the section of the profiled product obtained by expansion in the open atmosphere cannot be accurately predicted, and the cellular structure of the profile obtained may not be regular.

When the material is allowed to expand freely upon leaving the die, the computation of the shape of the latter is highly complicated, because it is found that the section of the die cannot be exactly homothetic to that of the profiled product to be obtained, and has to be determined experimentally in each case. Thus, for example, to obtain a profiled product of square section, it is necessary to give the die a concave curvilinear square section of smaller area, the reduction in area varying with the final section of the product, the composition of the extruded material, and the conditions of extrusion. However even with a correctly shaped die irregularities of shape still occur.

One known method of surmounting these difficulties depends on the use, immediately downstream of the die, of a shaper having an inside section identical to the section of the profiled product required, in which the expansion takes place, and which contains and regularizes the expansion of the extruded material to the desired constant shape and dimensions.

Nevertheless, the use of a shaper of this type, which is conventional in the extrusion of non-expansible plastic materials, encounters great difficulties in the case of expansible material. It is not possible to use a shaper with a cross-section identical in shape and dimensions with that of the die, because the material cannot expand therein, and the density of the profiled expanded product leaving the shaper would be very close to the real density of the unexpanded product. In addition, the pressure of the gases released by the expanding agent tends to force the profiled product against the walls of the shaper, and the expulsion of the profiled product from the shaper has to be effected by the worm. The periphery of the product is cooled by contact with the wall of the shaper, while the core remains hot. Thus the core, which is cooled by contact with the wall of the shaper, receives a concentration of material supplied by the worm, which hinders still further any possibility of expansion.

Attempts have been made to overcome these obstacles by using a die having a section smaller than that of the profiled product to be obtained, and therefore than the section of the shaper, in the belief that the larger section of the latter would produce the desired result by enabling the material leaving the die to expand freely. In practice, however, after expansion a fairly hard crust is formed on contact with the wall of the shaper because of the cooling previously mentioned, and this crust is forced against the wall by the expansion pressure. The frictional forces are then so great that a drawing caterpillar cannot withdraw the profiled product from the shaper without breaking the crust and consequently stretching the central portion of the profiled product, which has remained hot. At the same time the extrusion worm continues to feed material to the core of the profiled product, and the entire extrusion device may then become blocked. In addition, between the moment when the profiled product leaves the die and the moment when it is forced by expansion against the walls of the shaper, incipient fractures are frequently formed on its surface, which reduce its mechanical strength. This arrangement with a die of smaller section than that of the shaper can be used in practice only with profiled products of very small section, or with very low delivery rates, where the cooling is sufficiently rapid to enable the outer crust to be sufficiently strong to permit the extraction of the profiled product without the above mentioned drawbacks.

In certain cases it is desirable to obtain composite, profiled sections comprising an outer sheath made from thermoplastic and/or elastomer composition, and a cellular internal structure, the composition of which may be the same as, or different from that forming the outer skin or sheath.

Usually, when it is desired to produce such composite sections it is necessary to produce the sheath by extrusion in a first step, and then to fill said sheath in a second step with the cellular material. This production, which is not continuous, has in addition the disadvantage of permitting the manufacture of composite sections of a limited length only.

Composite sections can also be manufactured with the aid of a cross-head comprising coaxial die sections and connected to two extruders. One of the said extruders feeds the outer passage of said cross-head with a material intended to produce the outer sheath or skin by constraining the material to flow through an opening having substantially the shape and area of the sheath to be obtained, the said opening being defined on the outside by the so-called die and on the inside by a so-called mandrel and located axially of the sheath to be produced. The second extruder is connected to an opening which is located in the axis of the mandrel and the outlet of which leads into the sheath.

With such an apparatus the material is certainly expanded on leaving the passage situated in the axis of the mandrel and the sheath being extruded is filled with a cellular material, but only when the inner section of the sheath is of a simple shape, for example circular or square. Even in this case, for example with a sheath of square cross-section, tests have shown that in order to obtain good filling of said square cross-section the opening located in the axis of the mandrel and through which an expansible material is extruded to form the inner central part of the desired product should have an outlet cross-section of concave curvilinear square shape, with an area which is obviously much smaller than the inner surface of the sheath. In other words, in order to achieve a correct filling of the sheath of a passage extrusion opening should be used the outlet cross-section and shape of which can be determined only experimentally.

Such a method is still further limited by the degree of expansion of the material intended to form the cellular structure, because even in the case of the filling of a sheath of simple cross-section, for example square or circular but of fairly large dimensions, it is practically impossible to achieve close contact between the inner surface of the sheath being extruded and the outer surface of the cellular material undergoing expansion, which leads to the production of composite sections having mediocre mechanical properties.

An object of this invention is the easy manufacture of solid or hollow profiled products of expanded plastic material and of any section as regards shape and dimensions, which have a perfectly defined, constant profile over their entire length.

Another object of the invention is to produce solid or hollow sections of expanded plastic materials which have a smooth, glossy surface due to the formation of a continuous skin, substantially free from faults, both on their outer surface and, in the case of tubular hollow sections also on their inside surface.

Another object of the invention is to provide these sections with a regular cellular structure resulting in good mechanical properties.

Yet another object of the invention is to obtain highly improved mechanical properties for these sections by means of the aforesaid continuous skin.

Still another object of the invention is to provide a method for the obtention of composite sections comprising an outer sheath made from thermoplastic and/or elastomer composition, and a cellular internal structure also made from a thermoplastic and/or elastomer composition which may be the same as, or different from that forming said outer sheath, and in which a perfect and continuous bonding is created between the outer sheath and the inner cellular material.

These and other objects of the invention will become apparent in the course of the following description.

These objects are achieved according to the invention, by a method which comprises extruding expansible plastic material in an at least partly unexpanded state into an elongated shaper open at both ends disposed substantially coaxially with the die and having an inlet section substantially equal in area to the die and an outlet section identical to that of the product required, and providing a cavity inside the material during extrusion through the die, whereby the extruded material expands inwards so as to at least partially fill the cavity. The formulation of the composition to be extruded, as regards its expansion properties, and the conditions of the extrusion, the section of the internal cavity in the material during the expansion, and the length and profile of the shaper are determined so that the extruded material during its passage through the shaper undergoes the desired inwards expansion.

By the expansion "die section" is understood the cross-section at the outlet of the die, without taking into account the existence of the cavity formed inside the extruded composition.

When the material leaves the die and comes into contact with a shaper the temperature of which is below the softening point of the polymer, the latter rapidly forms a hard layer in contact with the wall of the shaper. During the performance of the invention, the expansion takes place fundamentally from the outside to inside, the material being pressed against the inside wall of the shaper. The section can thus slide in the shaper, firstly because the thrust of the worm is transmitted to the outer layers of the extruded material, which is rapidly solidified on contact with the shaper, and secondly because there is no ramming of material into the shaper. A drawing caterpillar may be used if desired, without any risk of breaking of the skin formed against the wall of the shaper, or any inequality caused by stretching. However, it is advantageous to make the maximum use of the thrust applied by the worms of the extruder in order to advance the extrudate through the shaper, and for this reason it is preferable to give the die and the shaper the same cross-section, so that the thrust of the worm can be transmitted to the hard outer layer.

It will be understood that it is thus possible to obtain extruded products of any section which have constant cross-sectional dimensions and a smooth surface. The cavity initially formed in the central portion of the section during extrusion may be filled completely or if preferred only partially by the expansion of the material.

The calculation of the various parameters determining the performance of the method according to the invention is very simple to anyone skilled in the art. Once the formulation of the expansible plastic composition to be extruded has been settled, this calculation is restricted to the selection of conditions by calculation and/or experimentation; these are, principally, the selection of the extrusion speed and temperature, the shape and dimensions of the hollow space inside the extruded product, (i.e. of the mandrel disposed in the die) and the length of the shaper so that on leaving the latter the material will have attained the desired dimensions.

Supplementary regulation of the expansion, also making it possible to control the thickness of the outer skin formed on the extruded material, may be achieved by raising or lowering the temperature of the die, mandrel, or walls of the shaper. This may be easily done, for example, by regulation of the electric heating and/or the circulation of heating and/or cooling fluid in these different parts.

As has been stated, the cavity originally formed in the centre of the extruded material need not be completely filled by expansion, and may be retained when the mechanical characteristics required in the final extruded products make this possible or desirable.

As has been indicated above, the invention makes it possible to obtain extruded products of all sections, particularly solid or massive sections, possibly containing the residual cavity referred to above, and also tubular products of any external and internal dimensions; in the latter case the free surfaces both on the outside and on the inside have the exceptionally advantageous qualities which have already been mentioned.

Tubular sections of this type may also be obtained.

It is likewise possible to obtain alternately solid and hollow sections by extruding an expansible plastic material by the method according to the invention. As the extruded product is continuously pulled out of the shaper, and the extrusion parameters are cyclicly varied to give alternate hollow and solid lengths of extruded product. Thus, during a first period of time the pulling speed may be such as to give a length of solid cross-section, then for a second period of time the speed may be increased to give a hollow length of extruded product, in which the expansion of the material is insufficient to fill the internal cavity. This cycle may be repeated or varied as often as desired.

It will be understood that by alternating a short period of extrusion at the desired pulling speed so as to obtain a solid length of extruded product, and then a longer period of extrusion at a higher pulling speed giving rise to the production of a hollow length, and then a further short period of extrusion at the first speed mentioned, a hollow length of extruded product closed at both ends will be formed. If extruded products having a rectangular section are produced in this manner, products similar to hollow bricks are obtained. By continuing these alternations of speed, either regularly or irregularly, it is possible to obtain a continuous hollow length of product having solid portions forming braces at regular or irregular intervals. The total apparent density of the lengths of product thus obtained is reduced, while mechanical strength properties are obtained. At the same time, their acoustic and thermal properties are improved because of the gas imprisoned therein.

As has been mentioned above, the thickness of the solid skin may be modified by adjusting the extrusion parameters, particularly the temperatures of the die, mandrel, and shaper. This thickness is reduced when these temperatures are raised. At the limit, there is no longer a smooth solid surface at all.

When it is desired to obtain a solid outer sheath closely covering an inner part of expanded material, the composition intended to form said outer sheath is extruded through a first annular die substantially conforming the shape of the desired sheath, in close vicinity of the inner wall or walls of the inlet part of the shaper, whereas the expansible composition is extruded as above disclosed through a die-section arranged inwardly and substantially coaxially with respect to said first die.

The accompanying drawings illustrate diagramatically, by way of example, various forms of construction of apparatus for carrying out the invention. In these drawings.

Figures 1, 3:
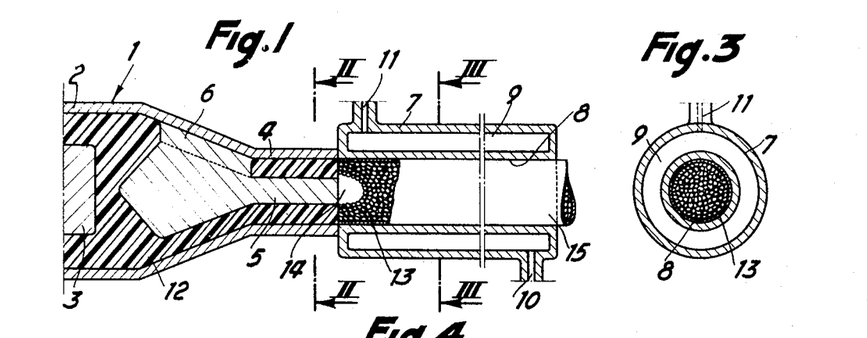
FIG. 1 is a longitudinal sectional view of the end of an extrusion machine with its die, and of a shaper for extruding a round bar.
FIG. 3 is a cross-sectional view of the shaper illustrated in FIG. 1.
Figure 2:
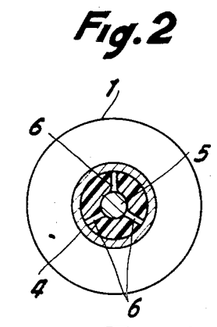
FIG. 2 is a cross-sectional view along line II—II in FIG. 1.

As illustrated in FIGS. 1 to 3, apparatus which may be used for carrying out the invention comprises an extrusion machine of any usual type, designated generally by the reference 1, and comprising a body 2, an extrusion worm 3, of which only the end is shown, and a die 4, which in the example selected is of circular section. A mandrel 5, held in the axis of the die by three supports 6 spaced at 120°, is arranged in the die. Against the outlet of the die is a shaper 7, constituted by a tubular sleeve forming a cylindrical guide having an inside wall 8, which may be smooth, of the same cross-section as the die 4 The shaper 7 has a double wall forming a heat-controlling jacket 9 provided with connections 10 and 11 enabling a temperature-controlling fluid to be circulated therein.

The expansible plastics composition 12 to be extruded, for example polystyrene containing an expanding agent and the usual additives, is introduced into the extrusion machine and driven by the worm 3 through the die 4 into the space between the mandrel 5 and the inside wall of said die. The extrusion conditions are such that the expansible composition is only slightly expanded or not expanded at all as it passes into the die but starts to expand immediately on leaving or shortly before leaving the latter. At the outlet of the die the material undergoing expansion is delivered through the shaper 7, the outlet of which is kept at a temperature lower than the gelling point of the extruded composition. On contact with the inside wall 8 of the shaper there is thus formed a hard layer 13 of plastic material, the thickness of which is not always as great as is shown in the drawing for the sake of clarity.

The expansion of the plastics material under the action of the expanding agent takes place inwardly filling the cavity 14 formed in the centre of the material by the mandrel 5. The shape and the dimensions of the latter and the length of the passage 8 in the shaper are calculated so that, taking into account the formulation of the composition to be extruded and the various conditions of extrusion, the inwards expansion of the material in the shaper leads to the at least partial filling of the void 14.

At the outlet of the shaper there is thus obtained a cylindrical bar 15 of expanded plastics material having a constant cross-section, which is the same as the cross-section of the outlet of the shaper. This bar has a smooth surface, if the inside wall of the shaper is itself smooth, and if the extrusion parameters, particularly the temperature of the mandrel, die and shaper, are judiciously selected. The bar is pushed through the shaper by the delivery of more expansible material by the worm 3, the pressure resulting from this delivery being applied directly to the outer layer 13. If this pressure is found insufficient to effect the necessary propulsion, use may be made of a drawing caterpillar (not shown) of any type which is connected to the end of the bar being extruded.

The temperature regulating jacket 9 of the shaper 7 enables the temperature of the shaper to be adjusted;

this temperature, together with those in the extrusion machine and in the die and the extrusion speed, constitute the main parameters of the extrusion conditions which, at the same time as the shape and dimensions of the mandrel 5, must be determined by calculation and-/or experimentation so that the desired result, namely the expansion of the material filling the central void 14 partially or totally, is obtained.

It will be realised that by the same principles it will be possible to obtain extruded products of absolutely any cross-section, the latter depending solely on the inside cross-section of the die and of the shaper.

Figure 4:
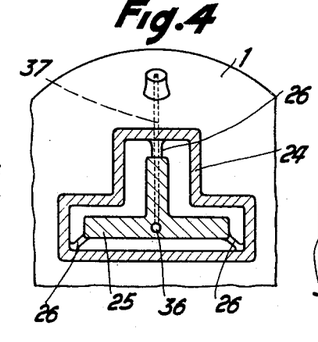
FIGS. 4 and 5 are cross-sectional views of a die for producing a T-section and of the corresponding shaper, respectively.
Figure 5:
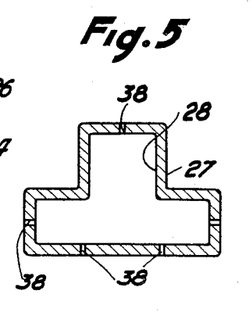

Thus, FIGS. 4 and 5 illustrate a die and a shaper intended for producing a T-section. In this example the die 24 has an inside section identical to that of the final product to be obtained and in said die there is engaged a mandrel 25 of T-shaped section which is held axially in the die by supports 26 situated at the rear portion of the mandrel, similarly to the supports 6 of the mandrel 5 illustrated in FIG. 1. The area of the section of the mandrel 25 is determined in dependence on all the extrusion conditions and the formulation of the extruded composition, so as to ensure that the expansion of the latter will take place inwardly, as has already been described with relation to FIGS. 1 to 3.

In order to facilitate the expansion of the material and the filling of the cavity caused by the mandrel 25 in the die 24, a slight reduced pressure may if desired be produced in said void. This may for example be achieved, as illustrated in FIG. 4, by means of a passage 36 provided longitudinally in the mandrel 25 and leading to the front face of the latter, said passage 36 communicating through a passage 37 transversely through the mandrel, one of the supports 26 and the wall of the extrusion machine 1, and capable of being connected to a vacuum source. Provision may also be made to provide a slight reduced pressure along the inside wall 28 of the shaper, for example by providing passages 38 of very small diameter through the wall of said shaper, as illustrated in FIG. 5, said passages being connected by any means (not illustrated) to a source of vacuum, which may be the same as that utilised to provide a reduced pressure in the centre of the material. This last arrangement is not always found necessary because the expansion of the material, while taking place from the exterior to the interior, also tends to apply the outer crust of the section being formed against the inside wall of the shaper. In addition, it is obvious that the arrangements which have just been described regarding the creation of a reduced pressure on the inside or outside of the section being formed are not specific to the shape of the section forming the object of FIGS. 4 and 5.

Figures 6, 7:
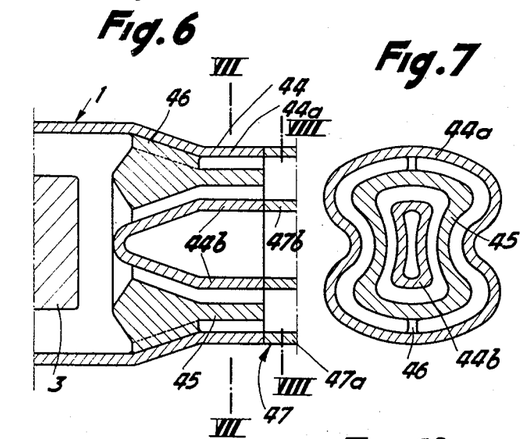
FIG. 6 is a longitudinal sectional view similar to that shown in FIG. 1, of an apparatus for producing a hollow section.
FIGS. 7 and 8 are cross-sectional views of the die and shaper, respectively, of the apparatus illustrated in FIG. 6, respectively along lines VII—VII and VIII—VIII in FIG. 6.
Figure 8:
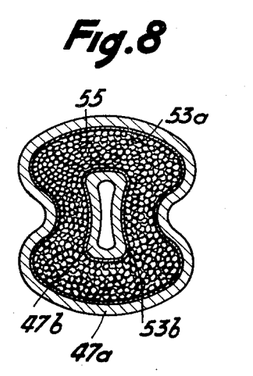

The invention also makes it possible to produce hollow or tubular sections of any shape, as illustrated by way of example in FIGS. 6 to 8. As illustrated in these Figures, the apparatus for performing the invention, for the purpose of obtaining a tubular section, comprises, in an extruding machine 1 provided with an extraction worm 3, a die 44 which has an outer wall 44a forming a closed curve, the inside path of which reproduces in section the shape of the outer section of the profiled product which it is desired to obtain, and a similar inside wall 44b, the outer contour of which reproduces in section that of the inside section of the desired hollow profiled product. In the annular die thus formed a likewise annular mandrel 45 is supported by feet 46, its shape and dimensions being predetermined as indicated in connection with the mandrel 5 illustrated in FIG. 1 and the mandrel 25 illustrated in FIG. 4. A shaper 47 having an outside wall 47a and an inside 47b respectively reproducing the contours of the walls 44a and 44b of the die is disposed directly at the outlet of the latter, the outer wall 47a and inner wall 47b at the shaper being held in position for example by fastening on the die with the aid of flanges or other means (not illustrated).

During extrusion with the aid of the apparatus just described, the material is delivered by the worm 3 of the extruding machine through the die 44, into the spaces between the mandrel 45 and the outer wall 44a on the one hand and the inner wall 44b of said die on the other hand, and is then fed into the shaper 47. The presence of the mandrel 45 produces in the mass of extruded material penetrating into the shaper 47 an annular cavity corresponding to that of the mandrel, said cavity being filled by the expansion of the material which takes place towards the interior of the space contained between the walls 47a and 47b of the shaper, along which walls the material solidifies on leaving the die, forming hard layers 53a and 53b (FIG. 8). At the outlet of the shaper there is thus obtained a tubular product having the cross-section illustrated at FIG. 8, this cross-section being constant and regularly reproducing that of the passage in the shaper, while both the outer surface and the inner surface of the extruded product may be smooth.

It is obvious that, as in the preceding cases, the shaper 47 may likewise be surrounded by a temperature controlling jacket, and passages may be provided to produce a reduced pressure both in front of the mandrel 45 and along the surface of the partitions in the shaper 47.

Figure 9:
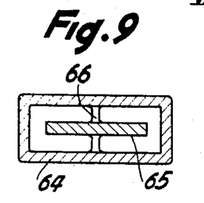
FIG. 9 is a cross-sectional view of a first embodiment of a die for extruding a board of rectangular section.
Figure 10:
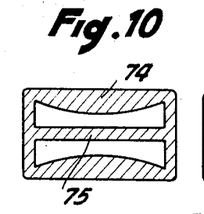
FIGS. 10 and 11 are cross-sectional views of another embodiment of a die for producing a board having a biconcave lens cross-section and of the corresponding shaper, respectively.
Figure 11:
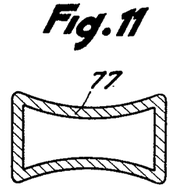

In certain cases the mandrel disposed in the die in order to form in the extruded material the cavity intended to be filled through the inwards expansion of the material, instead of being held axially in the die by providing a free space of predetermined cross-sectional dimensions all around said mandrel in the actual die, may be connected to the wall of the latter, forming a partition dividing the die into two or more separate passages. Thus, for the extrusion of a profiled product in the form of a board of rectangular section, it is possible, as illustrated in FIG. 9, to use in a die 64, which has a cross-section identical to that of the board to be obtained, a mandrel 65 of flattened shape which is held axially in the die with the aid of supports 66, similar to the supports 6, 26, or 46 in the preceding Figures. Alternatively, as illustrated in FIGS. 10 and 11 for the extrusion of a board having, for example, a different cross-section from that obtained with the aid of the die illustrated in FIG. 9 and having the shape of a biconcave lens, it is possible to use a die 74, the cross-section of which is the same as that of the extruded product to be obtained and is divided into two by a mandrel 75, which is in the form of a partition integral with the edges of the die. The material extruded through a die of this type into the shaper 77 having the same section as the board to be obtained undergoes in said shaper an inwards expansion resulting in the closing of the transverse void formed by the mandrel 75, forming partitions, the outer crust being formed continuously over the entire extent of the inside wall of the shaper 77.

Figure 12:
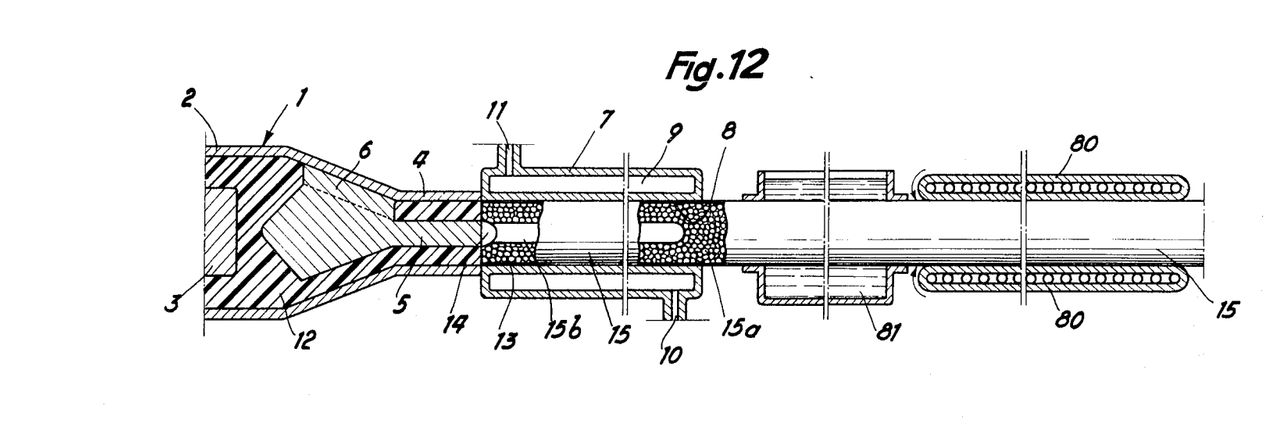
FIG. 12 illustrates diagrammatically in longitudinal section an example of equipment for carrying out the invention, in which the section is pulled at the outlet of the shaper, for the purpose of producing alternatively solid and hollow sections.

The equipment illustrated in FIG. 12 comprises, in the same manner as has already been described with reference to FIGS. 1 to 3, an extruder 1 with its body 2, its extrusion worm 3, and its die 4, in the axis of which is a mandrel 5 to form a central cavity 14 in the extruded product on leaving the die, and on the other hand the shaper 7 consisting of a tubular sleeve forming a cylindrical guide 8 having a smooth inside wall and of the same section as the die 4 and comprising a double wall forming a heat controlling jacket 9 provided with connections 10 and 11, which enable a temperature regulating fluid to be circulated therein.

A drawing caterpillar 80, operated by the usual drive mans (not illustrated) makes it possible to draw the section 15 in order to extract it from the shaper 7, which is here followed by a cooling tank 81 through which the section 15 passes. As has been described previously, the composition 12 of expansible plastics material which is to be extruded, for example polystyrene containing an expanding agent and the usual additives, is introduced into the extrusion machine and delivered by the worm 3 of the latter through the die into the space provided between the mandrel 5 and the inside wall of said die, the extrusion conditions being such that said material is only slightly expanded or not expanded at all when it passes into the die but starts its expansion immediately on leaving or shortly before leaving the latter. At the outlet of the die the material undergoing expansion is delivered through the shaper 7, the outlet of which is kept at a temperature lower than the gelling point of the extruded composition. On contact with the inside wall 8 of the shaper, there is thus formed a hard layer 13 of plastic material, the thickness of which is not always as great as is illustrated in the drawing for the sake of clarity.

The expansion of the plastics material under the action of the expanding agent takes place from the exterior to interior of the mass delivered into the shaper, filling the cavity 14 formed at the centre of the material through the presence of the mandrel 5.

Figure 13:
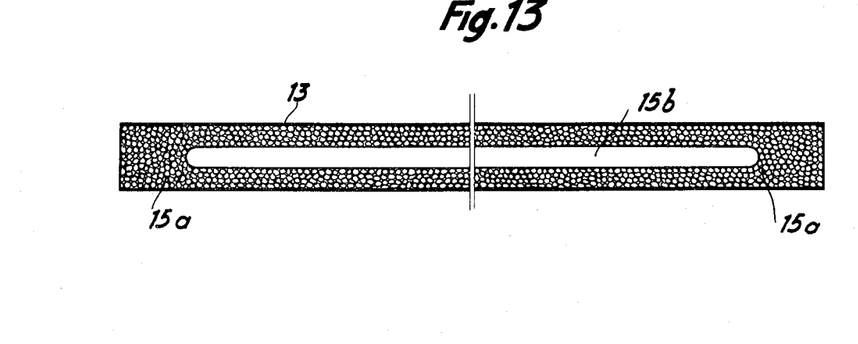
FIG. 13 is a longitudinal sectional view of an alternately solid and hollow section obtained in accordance with the invention.

By regulating the speed of drawing by the caterpillar 80 so that, taking into account the nature of the extruded composition and the other extrusion parameters, the expansion of the material, which tends to take place inwardly, completely fills the void 14, a section is first obtained which comprises a hard, compact outer layer 13, which may be smooth, and a solid cellular interior 15a. If after a certain extrusion time the drawing speed is increased so that there is no time for the expansion to take place as far as the axis of the section, the latter will not filled but will have a hollow internal zone 15b. Return to the first drawing speed will then produce a further length of solid section, and so on. An extruded product having alternately solid and hollow sections is shown in FIG. 13.

Figure 14:
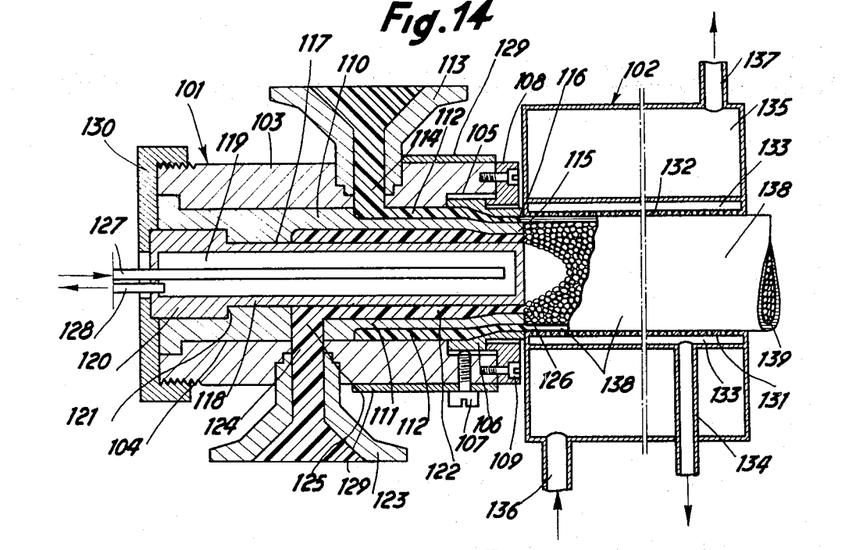
FIG. 14 is a longitudinal sectional view of an extrusion head and of a shaper for the extrusion of a composite section according to the invention.

As illustrated diagrammaticaly in FIG. 14, the apparatus for extruding a composite section comprises an extrusion head of the well-known cross-head type, which is designated generally by the reference 101 and a shaper 102.

The cross-head comprises a body 103 in which there is provided an axial passage 104 having at its downstream end a portion 105 of larger diameter, in which is arranged a die 106 of circular cross-section, the outer diameter of which is smaller than the inside diameter of said portion 105, said die being supported on the hand laterally by screws 107 passing through the body 103 of the head and regularly distributed around the latter, four or six such screws being for example provided, and on the other hand supported by an annular block 108 held on the front face of the body 103 of head 101 by screws 109. A sleeve 110 is introduced into the axial passage 104 of the body 103 of the head, the front portion 111 of said sleeve having a diameter smaller than that of the passage 104, so as to provide inside the body 103 an annular channel 112 for the passage of plastic compositions in the fused state, which is driven into said annular channel by a first worm extruder (not shown) fitted to a connection 113 communicating with a radial channel 114 formed in the body 103 and leading into annular channel 112. The front end 115 of sleeve 110 cooperates with die 106 to form an annular die section 116, through which the plastics material coming from the first extruder is extruded. The radial dimension or die section 116, which determines the thickness of the product extruded through said die section, may be made uniform over the entire periphery by adjusting the position of die 106 with the aid of screws 107 after slackening annular block 108, which is tightened again after this adjustment.

Near its rear end the sleeve 110 has a portion 117 of smaller diameter, in which is held a mandrel 118 provided with an inner cavity 119 and extending axially over the entire length of the head. The rear portion 120 of the mandrel 118, the outer diameter of which is greater than that of the remainder of its length, is held against a shoulder 121 formed by portion 117 of sleeve 110 by a cover 130 screwed on the rear end of the body 103 of head 101, said cover likewise holding the sleeve 110 in said body 103.

Between said mandrel 118 and the front portion of the sleeve 110 is provided a second annular channel 122 for the passage of an expansible plastics material composition in the fused state, which is forced into said annular channel by a second worm extruder (not shown) fitted to a connection 123, communicating with a radial channel 124 formed in body 103 and followed by a channel 125 leading into annular channel 122.

The front end 115 of sleeve 110 forms, in cooperation with mandrel 118, an annular die section 126 through which the expansible plastics material composition coming from the second extruder is extruded.

A heating liquid fed through pipe connections 127 and 128 may be circulated in the cavity 119 of mandrel 118 in order to maintain a well controlled determined temperature in said mandrel and consequently in the expansible composition passing through annular channel 122, while means such as an electric resistor 129 surrounding the front end of the cross-head 101, are provided to ensure that the desired temperature of the composition flowing through annular channel 112 is maintained.

The shaper 102 arranged in line with the cross-head 101 has an internal cylindrical wall 131 the diameter of which corresponds with that of die 106. This wall is pierced with a large number of capillary apertures 132 through which the axial cylindrical passage of the shaper communicates with an annular chamber 133 connected by a pipe 134 to a vacuum pump (not shown). Chamber 133 is itself surrounded by a jacket 135 provided with pipes 136 and 137 for the circulation of a cooling fluid, for example water.

A water cooling tank and a drawing crawler of conventional type (not shown) are provided downstream of the shaper.

The plastic composition extruded through channel 112 and the extrusion opening 116 forms a sheath 138, which is applied against the inner wall 131 of the shaper under the effect of the vacuum created in the annular chamber 133. The extruded expansible composition delivered through annular channel 122 and die section 126 is injected inside said sheath 138, in which its expansion takes place inwardly as herein above described. A section comprising an outer sheath 138 and an inner cellular portion 139 is thus obtained.

Figure 15:
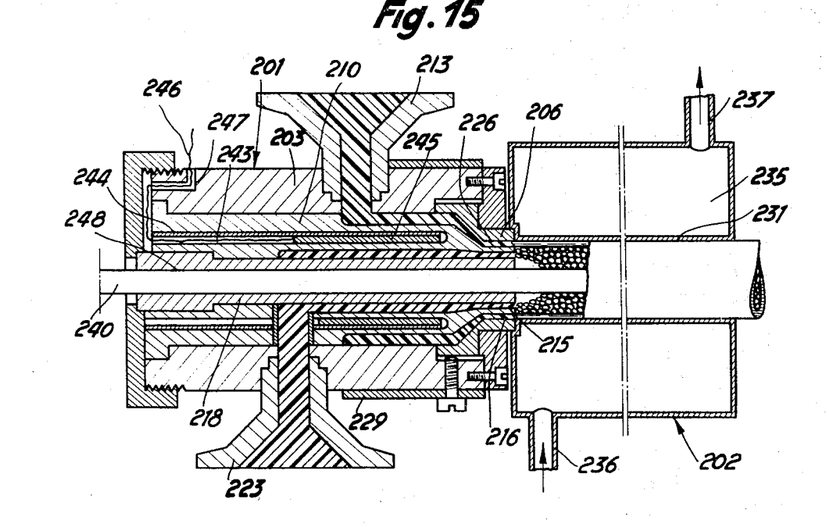
FIG. 15 is a similar view of a modification of the apparatus illustrated in FIG. 14, intended in this case for extruding a reinforced composite section.
Figure 16:
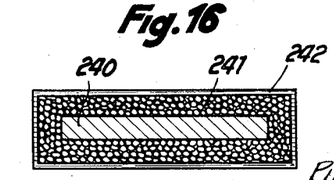
FIG. 16 is a cross-section of a reinforced section obtained with the apparatus illustrated in FIG. 15.

The apparatus illustrated in FIG. 15 generally comprises the same parts as that in FIG. 14. Said parts of corresponding to those in FIG. 14 are designated by the same reference numerals, with the addition of 100, and will be specifically described only to the extent to which they are modified as compared with the previously described apparatus. The selected example relates to the extrusion of a rectangular cross-section, as illustrated in FIG. 16, comprising a central metal core or reinforcement 240 surrounded by a layer of cellular plastic material 241, which in turn is covered by a sheath of compact plastic material 242.

For this purpose the die 206, the front end 215 of the sleeve 210, and the mandrel 218 have rectangular cross-sections of dimensions corresponding respectively to the desired result.

The sleeve 210 is here provided with an annular cavity 243 extending through practically its entire length and containing, on its face remote from the longitudinal axis, a heat insulating covering 244, for example of asbestos, and inside said covering, at the front portion of the sleeve, heating resistors 245 fed by leads 246 which pass out at the rear portion of the sleeve and to the outside of the body 203 of head 201 through a channel 247 provided for this purpose.

A bore 248 of rectangular cross-section is provided through mandrel 218 to permit the passage of the metal core 240.

The shaper 202 has a continuous inner wall 231, the use of vacuum not being provided in this example, and said wall 231 is surrounded directly by a cooling jacket 235 provided with water inlet and outlet pipes 236 and 237, respectively.

The extrusion of the composite section to be obtained is carried out as in the preceding example with the sole difference that the metal core 240 is passed through mandrel 218, and is driven during expansion by the conventional drawing crawler, which is also provided in this case and has not been illustrated.

The expansible plastics material processed in accordance with the invention may be of any known type, for example based either on polystyrene as previously mentioned above, or based on high or low density polyethylene, polyvinyl chloride (P.V.C.), acrylonitrile-butadiene-styrene (A.B.S.), A.B.S. + P.V.C. mixtures, polyamides, polycarbonates, or any other materials having similar bases. The invention is however applicable in a particularly advantageous manner to the production of sections of the expanded material disclosed in French Patent No. 1,225,499.

The following, non limitative examples illustrate the practical performance of the invention.

EXAMPLE I

For the purpose of producing a cylindrical rod, there was extruded a mixture based on polystyrene and expanding agent, having the following composition:

Polystyrene beads — 100 parts by weight
Sodium bicarbonate — 3 parts by weight

The extrusion was effected in a single-worm extruder having a diameter of 40 mm and a length of 20 diameters, the compression rate of the worm being 2.4 The extruder was provided with a circular die of a diameter of 31.2mm, in the axis of which there was held a solid mandrel having an outside diameter of 25 mm, while a cylindrical shaper having an inside diameter of 32 mm and a length of 25 cm was disposed directly at the outlet of the die and co-axially with the latter. The temperatures in the extruder, from the hopper to the die, were as follows: 120°–130°–130°–150°–130°–120°C. The worm was rotated at the rate of 25 revolutions per minute, and the extruded product was extracted with the aid of a drawing caterpillar at a speed of 0.35 metre per minute. The shaper was cooled by circulating water at ordinary temperature.

A solid cylindrical rod of a diameter of 32 mm, having a smooth, hard, and waterproof outer skin was obtained in this manner. The section of the rod was constant. Its density was about 0.5 to 0.6. The output was about 8 kilograms per hour.

EXAMPLE II

The following mixture was extruded to obtain a cylindrical rod:

a. Standard polystyrene beads
   (available commercially under the trade name Lorkalene, quality 8)— 100 parts by weight
   Sodium bicarbonate —5 parts by weight
   Vaseline Oil —0.1 parts by weight
   Stearic acid —0.1 parts by weight The mixture was homogenised for 3 minutes in a high speed mixer.

b. Extrusion was carried out in a single-worm extruder 40 cm. in diameter and 20 diameters long, the compression ratio of the worm being 2.5 The extruder was equipped, ahead of the die, with a sieve of 60 mesh/sq.cm.

The extruder was also equipped with a circular die head 31.8 mm. in diameter on the axis of which was fixed a solid mandrel 27.2cm. in external diameter. A cylindrical shaper 25 cm. long was fixed adjacent the outlet of the die and coaxially therewith. A conventional drawing caterpillar was arranged at the outlet of the shaper.

c. The conditions of extrusion were as follows:
   Temperatures of the body of the extruder, from the hopper to the head: 120°–140°–140°–147°C
   Temperatures of the extruder head and die: 130°C
   Worm: not cooled
   Body: cooled (by circulation of compressed air)
   speed of rotation of worm: 18 rpm;
   Drawing speed of extruded rod: 27 cm/min.
   Shaper cooled by continuous circulation of water at about 20°C.

d. There was thus obtained a solid, rigid, and perfectly cylindrical rod 32 mm. in diameter, with a cellular internal structure and a smooth and glossy skin.

Its specific gravity was 0.57, corresponding to an output of 7.5 kg/hour.

EXAMPLE III

The following mixture was extruded to obtain a cylindrical rod:

a. Small granules of impact polystyrene (available commercially under the trade-name Lorkalene, impact quality 800) —100 parts by weight
Sodium bicarbonate —5 parts by weight
Vaseline oil —0.1 parts by weight
Stearic acid —0.1 parts by weight The composition was homogenised for 3 minutes in a high-speed mixer.

b. Extrusion was carried out with the same machine as described in paragraph (b) of Example II.

c. The conditions of extrusion were as follows:
Temperatures of the extruder body from the hopper to the head: 120°–140°–140°–165°C.
Head temperature: 125°C
Die temperature: 120°C
worm not cooled.
Body cooled by circulation of compressed air.
Speed of rotation of worm : 17 rpm.
Drawing speed of rod extruded : 19.5 cm/min.
Shaper cooled by circulation of water at about 20°C.

d. There was thus obtained a solid, rigid, perfectly cylindrical rod 32 mm. in diameter, with a cellular internal structure and a smooth-surfaced skin.

The specific gravity was 0.65, corresponding to an output of 6.5 kg/hour.

EXAMPLE IV

The following mixture was extruded to obtain a cylindrical rod :

a. Small granules of styrene-acrylonitrile copolymer (SAN) (commercially available under the trade-name Dikaryl) : 100 parts by weight
Sodium bicarbonate : 3 parts by weight
Vaseline oil : 0.1 parts by weight
Stearic acid : 0.1 parts by weight The composition was homogenised for 3 minutes in a high-speed mixer.

The material was dried for 2 hours at 80°C.

b. Extrusion was carried out with the apparatus described in paragraph (b) of Example II.

c. The conditions of extrusion were as follows :
Temperature of the body of the extruder from the hopper to the head : 130° – 135° – 140° – 140°C.
Head temperature : 130°C.
Die temperature : 125°C
Extruder worm not cooled.
Extruder body cooled by circulation of compressed air.
Speed of rotation of worm : 20 rpm.
Speed of extrusion of rod : 27 cm/min.
Shaper cooled by continuous circulation of water at about 20°C.

d. There was thus obtained a solid, rigid, and perfectly cylindrical rod 32 mm. in diameter, with a cellular internal structure and a smooth and glossy surface.

The specific gravity was 0.55, corresponding to an output of 7.5 kg./hour.

EXAMPLE V

The following mixture was extruded to obtain a cylindrical rod :

a. Small granules of acrylonitrile-butadiene styrene-copolymer (ABS) (available commercially under the trade-name Lorkaril, quality JA) — 100 parts by weight
Sodium bicarbonate : 3 parts by weight
Vaseline oil : 0.1 parts by weight
Stearic acid : 0.1 parts by weight The composition was homogenised for 3 minutes in a high-speed mixer.

The material was dried for 3 hours at 80°C.

b. Extrusion was carried out with the apparatus described in paragraph (b) of Example II.

c. The extrusion conditions were as follows :
Temperatures of the body of the extruder from the hopper to the head : 130° – 140° – 140° – 150°C.
Head temperature : 135°C.
Die temperature : 125°C
Worm not cooled.
Body cooled by circulation of compressed air.
Speed of rotation of worm : 28 rpm.
Extrusion rate of rod : 31 cm/min.
Shaper cooled by continuous circulation of water at about 20°C.

d. There was thus obtained a solid, fairly rigid, and perfectly cylindrical rod, 32 mm. in diameter, with a cellular internal structure and a skin with a smooth and glossy surface.

Its specific gravity was 0.65, corresponding to an output of 10 kg/hour.

EXAMPLE VI

The following mixture (ABS + PVC) was extruded to obtain a coloured lightened rod :

a. PVC powder (trade-name Ekavyl SDF 58)—65 parts by weight
ABS powder (trade-name Lorkaril (JSR)) — 25 parts by weight
K120N (PMMA) powder : 15 parts by weight
Barium-cadmium salt stabilisers : Mark WS — 4 parts by weight
Mark C — 2 parts by weight
Calcium stearate : 0.5 parts by weight
Lubricant Wax E. — 0.2 part by weight
Tixolex (Silica) — 0.5 parts by weight
Sodium bicarbonate : 6 parts by weight
Colouring agents :
Titanium oxide RLS — 1.5 parts by weight
Neospectra black — 0.0617 parts by weight
Ultramarine blue — 0.045 parts by weight
Red FG 7816 — 0.0009 parts by weight The composition was homogenised for about 10 minutes in a high-speed mixer. The material (ABS only) was previously dried for 2 hours at 80°C.

b. Extrusion was carried out with the apparatus described in paragraph (b) of Example II.

c. The extrusion conditions were as follows :
Temperatures of the extruder body from the hopper to the head : 130° – 140° – 140° – 160°C.
Head temperature : 130°C.
Die temperature : 125°C .
Worm cooled by water.
Body cooled by circulation of compressed air.
Speed of rotation of worm : 53 rpm.
Rate of extrusion of rod : 25 cm/min.
Shaper cooled by gentle circulation of water at about 40°C.

d. There was thus obtained a solid, rigid, and perfectly cylindrical rod 32 mm. in diameter, with a cellular internal structure and a skin with a smooth and very glossy surface, coloured grey, and very deep, as if the rod had a compact structure.

Its specific gravity was 0.75, corresponding to an output of 9.700 kg/hour.

EXAMPLE VII

The following mixture (plasticised PVC) was extruded to obtain a cylindrical rod :

a. PVC powder Ekavyl (SDF 58) — 70 parts by weight
Plasticiser K8 (diisooctyl phtalate) — 15 parts by weight
K120 powder (PMMA) — 15 parts by weight
Stabilising barium-cadmium salts : Mark WS — 4 parts by weight
Mark C — 2 parts by weight
Calcium stearate — 0.5 parts by weight
Sodium bicarbonate — 6 parts by weight
Tixolex (silica) — 0.5 parts by weight The composition was homogenised for 1 ½ hour (dry blend) at 140°C in a high-speed mixer.

b. Extrusion was carried out with the machine described in paragraph (b) of Example II.

c. The extrusion conditions were as follows :
Temperatures of the extruder body from the hopper to the head : 135° - 145° - 165° - 175°C.
Head temperature : 135°C.
Die temperature : 120°C.
Worm cooled by water.
Body not cooled.
Rotation speed of worm : 49 rpm.
Extrusion rate of rod : 20 cm/min.
Shaper cooled by gentle continuous circulation of water at about 40°C.

d. There was thus obtained a solid perfectly cylindrical rod, 32 mm. in diameter, with a cellular internal structure and a skin with a smooth and glossy surface.

Its specific gravity was 0.82, corresponding to an output of 7.5 kg/hour.

EXAMPLE VIII

The following mixture (rigid PVC) was extruded to obtain a cylindrical rod :

a. PVC powder Ekavyl (SDF 52) — 80 parts by weight
K120N powder (PMMA) — 20 parts by weight
Barium-cadmium stabilising salts : Mark WS — 4 parts by weight
Mark C — 2 parts by weight
Calcium stearate — 0.5 parts by weight
Lubricant wax powder E — 0.2 parts by weight
Tixolex (silica) — 0.5 parts by weight
Sodium bicarbonate — 6 parts by weight The composition was rendered homogeneous by treatment for about 10 minutes in a high-speed mixer.

b. The extrusion was carried out in the apparatus described in paragraph (b) of Example II.

c. The extrusion conditions were as follows :
Temperatures of the extruder body form the hopper to the head : 140° - 155° - 165° -185°C.
Head temperature : 137°C.
Die temperature : 130°C.
Worm not cooled :
Body not cooled
Speed of rotation of worm : 24 rpm.
Rate of extrusion of rod : 29.5 cm/min.
Shaper cooled by gentle continuous circulation of water at about 40°C.

d. There was obtained a perfectly cylindrical solid rod, with a cellular internal structure and a skin with a smooth and glossy surface.

Its specific gravity was 0.75, corresponding to an output of 10.700 kg/hour.

EXAMPLE IX

The following mixture was extruded to obtain a cylindrical rod :

a. Polymethylmethacrylate beads (available under the trade-name of Altulite quality MBP) — 100 parts by weight
Sodium bicarbonate : 5 parts by weight
Vaseline oil : 0.05 parts by weight The composition was rendered homogeneous by treatment for 3 minutes in a high-speed mixer.

b. Extrusion was carried out with the apparatus described in paragraph (b) of Example II.

c. The extrusion conditions were as follows :
Temperatures of extruder body from the hopper to the head : 125° - 145° - 150° - 155°C.
Head temperature : 140°C.
Die temperature : 130°C.
Worm not cooled;
Body cooled by circulation of compressed air;
Speed of rotation of worm : 24 rpm.
Extrusion rate of rod : 23cm/min.
Shaper cooled by gentle continuous circulation of water at about 35°C.

d. There was thus obtained a solid perfectly cylindrical rod 32 mm. in diameter with a cellular internal structure, and a skin with a fairly smooth surface, which however, had a matt appearance.

EXAMPLE X

The following mixture was extruded to obtain a cylindrical rod :

a. Polyamide 11 granules (available commercially under the trade-name Rilsan, quality BES-HV.O) — 100 parts by weight
Vaseline oil : 0.05 parts by weight
Sodium bicarbonate : 1 parts by weight The composition was rendered homogeneous by treatment for about 3 minutes in a high-speed mixer.

b. Extrusion was carried out with the apparatus described in paragraph (b) of Example II. An insulating joint of Teflon (PTFE) was inserted between the parts denoted by 4 and 7 in FIG. 1.

c. The extrusion conditions were as follows :
Temperatures of the extruder body from the hopper to the head : 135° - 160° - 155° - 160°C.
Head temperature : 160°C.
Die temperature : 175°C.
Body and worm not cooled ;
Speed of rotation of worm : 24 rpm.
Extrusion rate of product : 34cm/min.
Shaper cooled by gentle continuous circulation of water at about 40°C.

d. There was thus obtained a solid perfectly cylindrical rod 31 mm. in diameter, with a cellular internal structure and a skin with a fairly smooth and slightly glossy surface.

The specific gravity was 0.51, corresponding to an output of 8.300 kg/hour.

EXAMPLE XI

The following mixture was extruded to obtain a cylindrical rod:

a. Small low pressure (High density) polyethylene granules (available commercially under the trade-name Manolene type 2) : 100 parts by weight
Vaseline oil : 0.1 parts by weight
Sodium bicarbonate : 5 parts by weight
The composition was homogenised by treatment for about 3 minutes in a high-speed mixer.

b. Extrusion was carried out with the apparatus described in paragraph (b) of Example II.

c. The extrusion conditions were as follows:
Temperatures of the extruder body from the hopper to the head : 135° – 150° – 155° – 180°C.
Head temperature : 135°C.
Die temperature : 130°C.
Body and worm not cooled.
Speed of rotation of worm : 35 rpm.
Extrusion rate of rod : 33.5 cm/min.
Shaper cooled by gentle continuous circulation of water at about 45°C.

d. There was thus obtained a solid perfectly cylindrical rod 32 mm. in diameter, with a cellular internal structure, and having a skin with a smooth glossy surface. It was fairly rigid and its specific gravity was 0.55, corresponding to an output of 8.800 kg/hour.

EXAMPLE XII

The following mixture was extruded to obtain a cylindrical rod:

a. High pressure polyethylene (commercially available under the trade-name Plastylene PA 0234, powder, grade 1.8): 100 parts by weight
High pressure polyethylene (commercially available under the trade-name Lupolen 1800 H, granules, grade about 1.8): 20 parts by weight
Sodium bicarbonate : 3 parts by weight
Two types of polyethylene, one powdered and the other granulated, were used to facilitate feed of the extruder.
The composition was homogenised by treatment for about 5 minutes in a high-speed mixer.

b. Extrusion was carried out with the apparatus described in paragraph (b) of Example II.

c. The extrusion conditions were as follows :
Temperatures of extruder body from the hopper to the head : 125° – 135° – 145° – 145°C.
Head and die temperatures: 130°C.
Worm and body not cooled;
Rotation speed of worm : 24 rpm.
Drawing speed of rod : 21 cm/min.
Shaper cooled by continuous circulation of water to about 20°C.

d. There was thus obtained a solid perfectly cylindrical rod, 32 mm. in diameter, with a cellular internal structure and a skin with a smooth surface. Its specific gravity was 0.5, corresponding to an output of 5 kg/hour.

When the drawing speed of the profiled product was increased to 31 cm/min. there was obtained a solid rod with a specific gravity of 0.32.

The cellular structure of the product did not preclude a certain flexibility. Thus, it was possible to form without breakage a circle of about 30 cm. in diameter from the rod of specific gravity 0.32, which returned to its former straight shape. A piece of rod 50 cm. long was easily twisted through 90° without visible change.

EXAMPLE XIII

The following mixture was extruded to obtain a cylindrical rod :

a. Polypropylene powder (commercially available under the trade-name Prylene ML 0622, grade 18): 100 parts by weight
Azodicarbonamide powder (ADCM supplied by Bayer) : 1 parts by weight
Vaseline oil : 0.05 parts by weight
The composition was homogenised by treatment for about 5 minutes in a high-speed mixer.

b. Extrusion was carried out with the apparatus described in paragraph (b) of Example II. An insulating joint of Teflon was placed between the parts denoted by 4 and 7 in FIG. 1.

c. The extrusion conditions were as follows :
Temperatures of the body of the extruder from the hopper to the head : 160° – 175° – 180° – 190°C.
Head temperature : 145°C.
Die temperature : 135°C.
Worm and body not cooled.
Speed of rotation of worm : 52 rpm.
Drawing speed of extruded rod : 27.5cm/min.
Shaper cooled by gentle continuous circulation of water at about 50°C.

d. There was thus obtained a perfectly cylindrical solid rod 32 mm. in diameter, having a cellular internal structure and a skin with a fairly smooth and slightly glossy surface. Its specific gravity was 0.56, corresponding to an output of 7.200 kg/hour.

EXAMPLE XIV

The following mixture was extruded to obtain a cylindrical rod :

a. Small polycarbonate granules (commercially available under the trade-name Makrolon type): 100 parts by weight
K3200 Azodicarbonamide powder (ADCM supplied by Bayer) : 1 parts by weight
Vaseline oil : 0.05 parts by weight
The composition was homogenised by treatment for about 3 minutes in a high-speed mixer.
The material was previously dried for 3 hours at 100°C.

b. Extrusion was carried out with the apparatus described in paragraph (b) of Example II.

c. The extrusion conditions were as follows:
Temperatures of the extruder body from the hopper to the head : 190° – 195° – 205° – 210°C.
Head temperature : 190°C.
Die temperature : 185°C.
Worm and body not cooled ;
Speed of rotation of worm : 29 rpm.
Drawing speed of extruded rod : 16.5 cm/min.
Shaper cooled by continuous circulation of water to about 25°C.

d. There was obtained a solid cylindrical rod 32 mm. in diameter, with a cellular internal structure, and a skin with a fairly smooth surface and slightly marbled matt appearance. Its specific gravity was 0.65, corresponding to an output of 5.200 kg/hour.

EXAMPLE XV

The following mixture was extruded to obtain a cylindrical rod :
a. Small cellulose propionate granules (commercially available under the trade-name Cellidor type CPH): 100 parts by weight
Azidocarbonamide powder (ADCM supplied by Bayer): 0.5 parts by weight
Vaseline oil : 0.05 parts by weight
The composition was homogenised by treatment for about 3 minutes in a high-speed mixer.
The material had previously been dried for 2 hours at 70°C.
b. The extrusion was carried out in the apparatus described in paragraph (b) of Example II. A Teflon insulating joint was placed between the parts denoted by 4 and 7 in FIG. 1.
c. The extrusion conditions were as follows :
Temperatures of the body of the extruder from the hopper to the head : 135° – 170° – 180° – 200°C.
Head temperature : 170°C.
Die temperature : 160°C.
Worm and body not cooled ;
Rotation speed of worm : 17 rpm.
Drawing speed of extruded rod : 23 cm/min.
Shaper cooled by gentle continuous circulation of water to about 40°C.
d. There was thus obtained a solid perfectly cylindrical rod 32 mm. in diameter, with a cellular internal structure and a skin with a smooth surface of a slightly marbled matt appearance. Its specific gravity was 0.65, corresponding to an output of 7.2 kg/hour.

EXAMPLE XVI

The following mixture was extruded to obtain a product of rectangular cross-section :
a. (Same composition as described in paragraph (a) of Example II (standard polystyrene) and prepared under the same conditions).
b. Extrusion was carried out in a single-worm extruder 45 mm. in diameter and 20 diameters in length, the compression ratio of the worm being 2.2. The extruder was equipped with a sieve of 60 mesh/cm$^2$ in front of the die.
The extruder was also equipped with a head having a rectangular die with an internal size of 33 × 23 mm., in the axis of which was fixed and carefully centred a solid rectangular mandrel measuring 29 × 19 mm.
A shaper with a rectangular passage measuring 33 × 20 mm. and 100 cm. long was arranged adjacent the die outlet and coaxially therewith. A conventional drawing-caterpillar was situated at the outlet of the shaper.
c. The extrusion conditions were as follows :
Temperature of the extruder body from the hopper to the head : 115° – 130° – 140° – 150°C.
Head temperature : 130°C.
Die temperature : 125°C.
Worm not cooled.
Body cooled by circulation of compressed air;
Speed of rotation of worm : 13 rpm.
Drawing speed of rectangular product : 35 cm/min.
Shaper cooled by continuous circulation of water to about 20°C.
d. There was thus obtained a solid rectangular profiled product measuring 33 × 23 cm. in cross-section, and with a cellular internal structure and a skin having a smooth surface, slightly glossy and slightly fibrous in appearance. Its specific gravity was 0.4, corresponding to an output of 6.400 kg/hour.

EXAMPLE XVII

The following mixture was extruded to obtain a cylindrical profiled product with a toothed surface :
a. (Same composition as described in paragraph (a) of Example I (standard polystyrene) and prepared under the same conditions).
b. The extrusion was carried out in a single-wormed extruder 60 cm. in diameter and 20 diameters in length, the compression ratio of the worm being 2.4 and no sieve being incorporated before the die. The extruder was equipped with a head, of which the die had the shape of a toothed wheel 24 mm. in diameter (60 small deep teeth per 0.5mm). On the axis of the die was fixed a solid mandrel 20 mm. in circular exterior diameter. A cylindrical shaper 24 mm. in diameter and 30 cm. long was placed 1 mm. from the die and coaxially with it. A conventional drawing caterpillar was arranged at the outlet of the shaper.
C. The extrusion conditions were as follows :
Temperatures of the body of the extruder, from the hopper to the head : 90°– 100° – 125° – 120° – 115°C.
Head temperature : 100°C.
Die temperature : 100°C.
Worm not cooled;
Body cooled by circulation of compressed air;
Speed of rotation of worm : 4 rpm.
Drawing speed of rod : 75 cm/min.
Shaper cooled by continuous circulation of water to about 20°C.
d. There was thus obtained a solid rod 24 mm. in diameter, having on its external surface very small mutually parallel grooves. These, which prevented the surface of the skin being perfectly smooth, endowed it with a non-slip surface. Its specific gravity was 0.38, corresponding to an output of 7.500 kg/hour.

EXAMPLE XVIII

The following mixture was extruded to produce a cylindrical profiled product with a smooth surface and the appearance of internal fibres :
a. Same extrusion composition as described in paragraph (a) of Example II (standard polystyrene), prepared under the same conditions.
b. The extrusion was carried out with the apparatus described in paragraph (b) of Example XVII. The shaper was kept in contact with the die and coaxially therewith.
c. The extrusion conditions were those given in paragraph (c) of Example XVII, the drawing speed being 65 cm/minute.
d. There was thus obtained a solid perfectly cylindrical rod 24 mm. in diameter, with a cellular internal structure and a smooth-surfaced skin without external serration. The product thus had a surface which had the appearance of a fibrous nature, the fibres being due to the flattening of the small serrations by contact with the shaper. The specific gravity of the rod obtained was 0.43, corresponding to an output of 7.500 kg/hour.

EXAMPLE XIX

The following mixture was extruded to obtain a cylindrical profiled product, alternately hollow and solid :

a. Same composition as described in paragraph (a) of example II (standard polystyrene).

b. Extrusion was carried out with the apparatus described in paragraph (b) of Example II.

c. The extrusion conditions were as follows :

Temperatures of the extruder body from the hopper to the head : 120° – 140° – 140° – 150°C.

Head temperature : 120°C.

Die temperature : 115°C.

Body cooled by circulation of compressed air.

Shaper cooled by continuous circulation of water to about 20°C.

The above composition was extruded for 4 hours, the following cycle of drawing speeds being used :

22cm/min. for 60 seconds;
38cm/min. for 120 seconds;
22cm/min. for 60 seconds;
38 cm/min. for 120 seconds; etc.

d. There was thus obtained a perfectly cylindrical rod (FIG. 13) 32 mm. in diameter with a hard, smooth, and compact external wall. This rod had, roughly every 1,000 mm., solid cellular sections of average length 200 mm. and specific gravity 0.6, separated by a hollow section about 800 mm. long and bounded by a smooth, compact, cellular outer wall, with a total thickness of 7 mm, this cellular outer wall being of specific gravity 0.55. The apparent specific gravity of the whole profiled product was 0.45.

By cutting the product at convenient points there were obtained pieces 100 mm. long closed at each end for a length of 100 mm. and containing a central hollow portion 800 mm. long. (FIG. 13). The output obtained was 7 kg/hour.

EXAMPLE XX

The following mixture was extruded to obtain an alternately solid and hollow cylindrical profiled product :

a. Same composition as that described in paragraph a. of Example XII (high pressure polyethylene)

b. Extrusion was carried out with the apparatus described in paragraph (b) of Example II.

c. The extrusion conditions were the same as those given in paragraph (c) of Example XII.

The above composition was extruded using the following cycle of drawing speeds :

31cm/minute for 60 seconds;
40 cm/minute for 120 seconds;
31 cm/minute for 60 seconds;
40 cm/minute for 120 seconds; etc.

d. There was thus obtained a cylindrical profiled product (FIG. 13) 32 mm. in diameter, alternately solid and hollow, with outer walls 10 mm. thick in the hollow sections.

The apparent density of the profiled product was 0.29.

EXAMPLE XXI a. The following mixture was extruded to obtain a cylindrical rod :

Small high pressure vulcanizable polyethylene granules (commercially available under the commercial name Vulcanizable BAKELITE quality HFDG 4208 natural): 100 parts by weight Sodium bicarbonate: 5 parts by weight Vaseline oil: 0.1 parts by weight The composition was homogenised by treatment for about 3 minutes in a high-speed mixer.

b. Extrusion was carried out with the apparatus described in paragraph (b) of Example II.

c. The extrusion conditions were as follows :

Temperatures of the extruder body from the hopper to the head: 70° – 100° – 110° – 125°C Head temperature: 115°C Die temperature: 110°C Worm not cooled Body cooled by circulation of compressed air Speed of rotation of worm : 24 rpm Extrusion rate of rod : 28 cm/min.

Shaper cooled by circulation of water at about 35°C and under vacuo.

d. There was thus obtained a solid perfectly cylindrical rod 32 mm in diameter, with a cellular internal structure and having a smooth skin. Its specific gravity was 0.42 corresponding to an out put of 5.750 kg/hour

EXAMPLE XXII

For the extrusion of a composite cylindrical rod comprising an outer sheath of polyethylene and an internal cellular structure of expanded polystyrene, use was made of the apparatus illustrated in FIG. 14, with the following dimensional characteristics.

The first extruder, connected to the connection 113 of the cross-head, had a diameter of 40 mm and a length of 20 diameters. The compression rate of the worm was 3.

The second extruder, connected to the connection 123 of the cross-head, had a diameter of 60 mm and a length of 20 diameters. The compression rate of the worm was 2.

The die 106 had a section with an internal diameter of 38 mm. The front end 115 of the sleeve 110 had an external diameter of 36 mm and an internal diameter of 32 mm. The diameter of the mandrel 118 was 25 mm and the inside diameter of the shaper was 38.2 mm, its length being 25 cm.

The first extruder, for producing the sheath through the die section 116, was fed with low density polyethylene powder of the grade sold under the commercial name Plastylene. The temperature read on the body of this extruder, from inlet to outlet, were as follows : 140° – 150° – 160° – 160°C. The temperature in the die section 116 formed between die 106 and the front end 115 of sleeve 110 was maintened at 160°C by resistor 129. The speed of rotation of the worm was 15 rpm.

The second extruder for producing the internal cellular structure of the rod and delevering through the die section 126, was fed with the following expansible composition, the parts being indicated by weight :

Polystyrene beads (Lockacel 12) : 100 parts

Sodium bicarbonate $NaHCO_3$ (expanding agent) : 3 parts

Stearic acid (lubricant) : 0.2 parts.

From inlet to outlet the temperature in this extruder were : 120° – 130° – 130° – 140°C. The temperature in the die section 126 formed between the front end 115 of sleeve 110 and mandrel 118 was kept close to 120°C by circulating oil at said temperature in mandrel 118.

The speed of rotation of the worm of this extruder was 15 rpm.

The shaper was cooled by circulation of water at 18°C and the vacuum pump connected to the evacuation pipe 134 was put into operation.

A cylindrical rod of a diameter of 38 mm was thus obtained which had an internal cellular structure of a diameter of 36 mm, specific gravity 0.48 covered by a smooth, compact sheath of low density polyethylene of a thickness of 1 mm.

EXAMPLE XXIII

For the extrusion of a composite cylindrical rod comprising an external sheath of polymethyl methacrylate and an internal cellular structure based on polyvinyl chloride (PVC), use was made of the same apparatus as that described in Example XXII, with the sole difference that the compression rate of the worm of the second extruder connected to the connection 123 of the cross-head was 3 and the speed of rotation of said worm was 25 rpm.

The first extruder, for the formation of the sheath through the die section 116, was fed with the die of polymethyl methacrylate beads of the grade sold under the commercial name ALTULITE grade MBP. From inlet to outlet the temperature in this extruder were : 140° – 160° – 170° – 180°C. The temperatures in the die section formed between the die 106 and the front end 115 of sleeve 110 was kept at 160°C by means of resistor 129.

The second extruder, for producing the internal cellular structure of the rod and delevering through the die section 126, was fed with the following expansible composition the proportions being indicated in parts by weight :

PVC powder (K value 58) (Ekavyl SDF 58) : 80
Polymethyl methacrylate (PMMA) beads (K 120N) : 20
Barium and cadmium salts :
  Mark WS: 6
  Mark C: 2
Lubricant (wax E): 0.2
Tixolex (silica powder): 0.5
Sodium carbonate: 6

From inlet to outlet the temperatures in this extruder were : 140° – 160° – 170° – 180°C. The temperature in the die section 126 formed between the front end 115 of the sleeve 110 was kept at about 170°C by circulating oil at said temperature in mandrel 118. The speed of rotation of the worm of this extruder was 13 rpm.

The shaper was cooled by circulating water at 18°C, but the vacuum pump was not connected.

There was thus obtained a cylindrical rod of a diameter of 38 mm comprising an internal cellular structure of a diameter of 36.2 mm, specific gravity 0.65, and covered by a smooth, compact sheath of polymethyl methacrylate of a thickness of 0.9 mm.

EXAMPLE XXIV

A composite rectangular section (FIG. 16) was extruded, comprising a core composed of a flat section 240 of aluminum, cross-section 80 × 100 mm, covered by a cellular structure 241 based on a acrylonitrile-butadienstyrene (ABS) and polyvinyl chloride (PVC) copolymer of a thickness of 10 mm, which in turn was covered by a sheath 242 of polypropylene of a thickness of 0.5 mm.

For this purpose, use was made of an apparatus of the type illustrated in FIG. 15, having the following dimensional characteristics.

The first extruder, connected to the connection 213 of the cross-head, had a diameter of 40 mm and a length of 20 diameters. The compression rate of the screw was 2.5.

The second extruder, connected to the connection 223 of the cross-head had a diameter of 60 mm and a length of 20 diameters. The compression rate of the screw was 3.

The rectangular cross-sections of the die 206, of the front end 215 of sleeve 210, and of mandrel 218, and the the dimensions of the shaper were as follows :

Inside cross-section of die 206 : 101 × 31 mm
Outside cross-section of end 215 of sleeve 210 : 100 × 30 mm
Inside cross-section of end 215 of sleeve 210 : 96 × 26 mm
Outside cross-section of mandrel 218: 92 × 22 mm
Inside cross-section of mandrel 218: 80 × 10 mm
Inside cross-section of shaper : 101.2 × 31.2 mm
Length of shaper : 250 mm The first extruder, for forming the sheath through die section 216, was fed with polypropylene sold under the commercial name PRYLENE ML 0622, grade 18. The temperatures read on the body of this extruder were, from inlet to outlet : 160° – 175° – 180° – 185°C. The temperature in the die section 216 formed between die 206 and the front end 215 of sleeve 210 was kept at 190°C by resistor 229. The speed of rotation of the worm was 8 rpm.

The second extruder, for the production of the internal cellular structure of the section and delivering through die section 226, was fed with the following expansible composition, the proportions being indicated in parts by weight.

PVC powder (K value 58, Ekavyl SDF) : 65
ABS (Lorkaril JSR) : 25
PMMA powder (K 120 N) : 15
Barium and cadmium salts : 6
Calcium stearate : 0.5
Lubricant (wax E) : 0.2
NaHCO$_3$ : 6

This composition had been homogeneized by passing for 10 minutes through a high speed mixer, the temperature of the ABS powder having first been raised to 80°C for 2 hours.

From inlet to outlet the temperatures in this extruder were : 130° – 140° – 145° – 160°C. The temperature in the die section 226 formed between the front end 215 of sleeve 210 was kept close to 130°C by resistors 245. The speed of rotation of the worm of this extruder was 23 rpm.

The aluminum section was introduced through mandrel 218 and pushed progressively at the beginning of the extrusion operation, after which it was driven, with the entire extruded product, by the drawing crawler arranged downstream of the shaper.

The specific gravity of the cellular structure 241 of the composite section thus obtained was 0.70.

It will be understood that many modifications can be made in the performance of the invention described above, without departing from the spirit and scope of the following claims.

I claim:

1. A method of producing a foamed extruded thermoplastic material product, the thermoplastic material being selected from the group consisting of polystyrene, polyvinyl chloride, polyethylene, acrylonitrile-butadiene-styrene copolymers, polyamides, polycarbonates, polyurethanes, styrene-acrylonitrile copolymers, polymethyl methacrylate, polypropylene, cellulose propionate, and mixtures thereof, wherein the thermoplastic material with an expanding agent therein is extruded from a die outlet into and through a shaper, the shaper having an internal solid surface defining a channel, the channel being disposed substantially coaxially with the die, and having an inlet and an outlet, the inlet edge of the shaper substantially coinciding with the outlet edge of the die, the cross-sectional area of the shaper being substantially larger than the cross-sectional area of the die outlet, thereby providing a void in the channel for the expansion of the thermoplastic material, the channel outlet cross-section being substantially that of the product required, and the channel having substantially the same cross-sectional size and shape along its full length,
    cooling the internal solid surface of the shaper to a temperature below the softening point of the thermoplastic material,
    extruding the foamable thermoplastic material through the die outlet in the form of a tubular body with a hollow cavity therein and an external surface thereon, the temperature of the thermoplastic material being in the range from 70° to 210°C,
    immediately contacting the external surface of the tubular body with the cooled internal solid surface of the shaper, thereby cooling rapidly the external surface of the extruded tubular body below the softening point of the thermoplastic material to retard foaming of the extruded material on the external surface and to form a thick skin of higher density material thereon, thereby imparting sufficient mechanical strength to the extruded product in the shaper to permit it to be extruded through the shaper, and
    expanding the extruded material forming the tubular body toward the inside of the channel to at least partially fill the hollow cavity of the tubular body.

2. The method of claim 1 wherein the cavity inside the extruded material is produced by a mandrel coaxial with the die and disposed therein.

3. The method of claim 1 wherein the extruded material expands toward the inside of the channel to fill the hollow cavity in every portion of the tubular body, whereby a solid extruded product is produced.

4. The method of claim 1 wherein the extruded material expands toward the inside of the channel to fill the hollow cavity in at least two portions of the tubular body, whereby an extruded product having at least one hollow portion therein is produced.

5. The method of claim 1 wherein for a first period of time a solid product is produced, and for a second period of time a hollow product is produced, the cycle being repeated at least once, whereby a product having alternate hollow and solid sections is produced.

6. The method of claim 1 wherein the inlet edge of the shaper channel defines a cross-sectional area substantially the same size and shape as the die section.

7. The method of claim 1 comprising the additional step of feeding the elongated core member in a continuous manner within said hollow cavity in said extruded tubular body during extrusion.

8. The method of claim 1 further comprising the step of pulling the extruded product through the shaper.

9. The method of claim 8 wherein the extruded product is pulled through the shaper by means of a drawing caterpillar, the drawing caterpillar being positioned downstream of the shaper and along the path of travel of the extruded product.

10. A method of producing a foamed extruded thermoplastic material product, the thermoplastic material being selected from the group consisting of polystyrene, polyvinyl chloride, polyethylene, acrylonitrile-butadiene-styrene copolymer, polyamides, polycarbonates, polyurethanes, styrene-acrylonitrile copolymers, polymethyl methacrylate, polypropylene, cellulose propionate, and mixtures thereof, wherein the thermoplastic material with an expanding agent therein is extruded from a die outlet into and through a shaper, the shaper having an internal solid surface defining a channel, the channel having an inlet and an outlet, the inlet edge of the shaper channel substantially coinciding with outlet edges of the die, the channel area of the inlet circumscribing and being larger than the area of the die outlet thereby forming a void in the channel for expansion of the thermoplastic material, the channel outlet cross-section being substantially that of the product required, and the channel having substantially the same cross-sectional size and shape along its full length,
    cooling the internal solid surface of the shaper to a temperature below the softening point of the thermoplastic material,
    extruding the foamable thermoplastic material through the die outlet, the temperature of the thermoplastic material being in the range from 70° to 210°C, the extruded material having an external surface thereon,
    immediately contacting said external surface with the cooled internal solid surface of the shaper, thereby cooling rapidly said external surface below the softening point of the thermoplastic material to retard foaming of the extruded material along the entire length of the extruded product and to form a thick skin of higher density material thereon, thereby forming a continuous area of thick skin on the external surface of the extruded product and imparting sufficient mechanical strength thereto in the shaper to permit it to be extruded through the shaper, and
    expanding the extruded material from the external surface with the thick skin thereon toward the inside of the shaper channel to substantially fill the channel.

11. The method of claim 10 further comprising the step of pulling the extruded product through the shaper.

12. The method of claim 11 wherein the extruded product is pulled through the shaper by means of a drawing caterpillar, the drawing caterpillar being positioned downstream of the shaper and along the path of travel of the extruded product.

13. A method of producing a foamed extruded thermoplastic material product, the thermoplastic material being selected from the group consisting of polystyrene, polyvinyl chloride, polyethylene, acrylonitrile-butadiene-styrene copolymers, polyamides, polycarbonates, polyurethanes, styrene-acrylonitrile copolymers, polymethyl methacrylate, polypropylene, cellulose propionate, and mixtures thereof, wherein the thermoplastic material with an expanding agent therein is extruded from a die outlet into and through a shaper, the shaper having an internal solid surface defining a channel, the channel having an inlet and outlet, the inlet perimeter of the shaper substantially coinciding with outlet edges of the die for substantially the entire perimeter of the inlet of the shaper, the cross-sectional area of the shaper being substantially larger than the cross-sectional area of the die outlet, thereby providing a void in the channel for the expansion of the thermoplastic material, the channel outlet cross-section being substantially that of the product required, and the channel having substantially the same cross-sectional size and shape along its full length, cooling the internal solid surface of the shaper to a temperature below the softening point of the thermoplastic material, extruding the foamable thermoplastic material through the die outlet, the temperature of the thermoplastic material being in the range from 70° to 210°C, immediately contacting the external surface of the extruded thermoplastic material with the cooled internal solid surface of the shaper, thereby cooling rapidly the external surface of the thermoplastic material below the softening point of the thermoplastic material to retard foaming of the extruded material on the external surface and to form a thick skin of higher density material thereon, thereby imparting sufficient mechanical strength to the extruded product in the shaper to permit it to be extruded through the shaper, and expanding the extruded material toward the inside of the channel to at least partially fill said void.

14. The method of claim 13 further comprising the step of pulling the extruded product through the shaper.

15. The method of claim 14 wherein the extruded product is pulled through the shaper by means of a drawing caterpillar.

* * * * *